US010588053B2

(12) United States Patent
Kim et al.

(10) Patent No.: US 10,588,053 B2
(45) Date of Patent: Mar. 10, 2020

(54) CLUSTER-BASED COLLABORATIVE TRANSMISSION METHOD IN WIRELESS COMMUNICATION SYSTEM AND APPARATUS THEREFOR

(71) Applicants: LG ELECTRONICS INC., Seoul (KR); KOREA ADVANCED INSTITUTE OF SCIENCE AND TECHNOLOGY, Daejeon (KR); RESEARCH & BUSINESS FOUNDATION SUNGKYUNKWAN UNIVERSITY, Suwon-si, Gyeonggi-do (KR)

(72) Inventors: Tae Yeoung Kim, Suwon-si (KR); Dongin Kim, Seongnam-si (KR); Wan Choi, Seoul (KR); Hanbyul Seo, Seoul (KR)

(73) Assignees: LG ELECTRONICS INC., Seoul (KR); KOREA ADVANCED INSTITUTE OF SCIENCE AND TECHNOLOGY, Daejeon (KR); RESEARCH & BUSINESS FOUNDATION SUNGKYUNKWAN UNIVERSITY, Suwon-si, Gyeonggi-Do (KR)

( * ) Notice: Subject to any disclaimer, the term of this patent is extended or adjusted under 35 U.S.C. 154(b) by 128 days.

(21) Appl. No.: 15/747,318

(22) PCT Filed: Aug. 30, 2016

(86) PCT No.: PCT/KR2016/009632
§ 371 (c)(1),
(2) Date: Jan. 24, 2018

(87) PCT Pub. No.: WO2017/039274
PCT Pub. Date: Mar. 9, 2017

(65) Prior Publication Data
US 2018/0213442 A1 Jul. 26, 2018

Related U.S. Application Data

(60) Provisional application No. 62/211,862, filed on Aug. 30, 2015.

(51) Int. Cl.
*H04W 28/14* (2009.01)
*H04B 7/024* (2017.01)
(Continued)

(52) U.S. Cl.
CPC ........... *H04W 28/14* (2013.01); *H04B 7/024* (2013.01); *H04W 72/0426* (2013.01);
(Continued)

(58) Field of Classification Search
CPC . H04W 28/14; H04W 72/0426; H04W 88/08; H04W 72/0466; H04B 7/024; H04L 5/0035; H04L 5/0053; H04L 5/0016
See application file for complete search history.

(56) References Cited

U.S. PATENT DOCUMENTS 7,254,754 B2 * 8/2007 Hetzler ............... G06F 11/1076
714/6.2
7,379,974 B2 * 5/2008 Hetzler ............... G06F 11/1076
707/999.007

(Continued)

FOREIGN PATENT DOCUMENTS

KR 10-2012-0136773 A 12/2012

*Primary Examiner* — Andrew Lai
*Assistant Examiner* — Chuong M Nguyen
(74) *Attorney, Agent, or Firm* — Birch, Stewart, Kolasch & Birch, LLP

(57) ABSTRACT

The present application discloses a method for receiving, by a terminal, data in a wireless communication system. Specifically, the method for receiving data comprises the steps
(Continued)

of: receiving a first division code from a first helper node in a first time unit; overhearing a second division code transmitted from a second helper node to another terminal in a second time unit; and acquiring the data by using the first division code and the second division code.

8 Claims, 7 Drawing Sheets

(51) Int. Cl.
*H04W 72/04* (2009.01)
*H04L 5/00* (2006.01)
*H04W 88/08* (2009.01)

(52) U.S. Cl.
CPC .......... *H04L 5/0016* (2013.01); *H04L 5/0035* (2013.01); *H04L 5/0053* (2013.01); *H04W 72/0466* (2013.01); *H04W 88/08* (2013.01)

(56) References Cited

U.S. PATENT DOCUMENTS

| | | | |
|---|---|---|---|
| 7,533,325 B2* | 5/2009 | Hetzler | G06F 11/008 714/6.2 |
| 9,973,215 B1* | 5/2018 | Sivakumar | H03M 13/13 |
| 2008/0247355 A1 | 10/2008 | Ahn | |
| 2008/0279296 A1* | 11/2008 | Roh | H04L 1/0057 375/260 |
| 2011/0126077 A1* | 5/2011 | Park | H04L 1/0057 714/755 |
| 2011/0176474 A1 | 7/2011 | Saito et al. | |
| 2011/0199950 A1* | 8/2011 | Klingenbrunn | H04W 36/14 370/311 |
| 2012/0155361 A1 | 6/2012 | Wei et al. | |
| 2013/0148563 A1* | 6/2013 | Brueck | H04W 4/06 370/312 |
| 2014/0219179 A1* | 8/2014 | Zakrzewski | H04W 4/18 370/328 |

\* cited by examiner

CLUSTER-BASED COLLABORATIVE TRANSMISSION METHOD IN WIRELESS COMMUNICATION SYSTEM AND APPARATUS THEREFOR

CROSS REFERENCE TO RELATED APPLICATIONS

This application is the National Phase of PCT International Application No. PCT/KR2016/009632, filed on Aug. 30, 2016, which claims priority under 35 U.S.C. 119(e) to U.S. Provisional Application No. 62/211,862, filed on Aug. 30, 2015, all of which are hereby expressly incorporated by reference into the present application.

TECHNICAL FIELD

The present invention relates to a wireless communication system, and more particularly, to a cluster-based collaborative transmission method in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a cluster-based collaborative transmission method in a wireless communication system and an apparatus therefor.

Technical Solution

According to one aspect of the present invention, a method for receiving, by a UE, data in a wireless communication system comprises the steps of receiving a first division code from a first helper node in a first time unit; overhearing a second division code transmitted from a second helper node to another UE in a second time unit; and acquiring the data by using the first division code and the second division code.

According to another aspect of the present invention, a UE in a wireless communication system comprises a radio frequency (RF) module; and a processor, wherein the processor receives a first division code from a first helper node in a first time unit, overhears a second division code transmitted from a second helper node to another UE in a second time unit, and acquires the data by using the first division code and the second division code.

In this case, the first and the second division codes are previously arranged from a network to the first and second helper nodes. Preferably, the first and the second division codes are previously arranged in the first and second helper nodes on the basis of popularity of the UE for the data. Particularly, the first and the second division codes are rateless MDS (Maximum Distance Separable) codes.

Additionally, the first and the second division codes are not overlapped with each other. The first and the second helper nodes are determined considering the presence of the data and overlap of the first and second division codes.

Advantageous Effects

According to the embodiment of the present invention, capacity of a cellular network may be increased remarkably, and improved quality of experience (QoE) may be provided to users. Also, since a cache memory needs cost cheaper than that for increase of base stations, the cost for communication network infrastructure construction may be saved remarkably.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

In the present disclosure, a base station (eNB) may be used as a broad meaning including a remote radio head (RRH), an eNB, a transmission point (TP), a reception point (RP), a relay, etc.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 1:
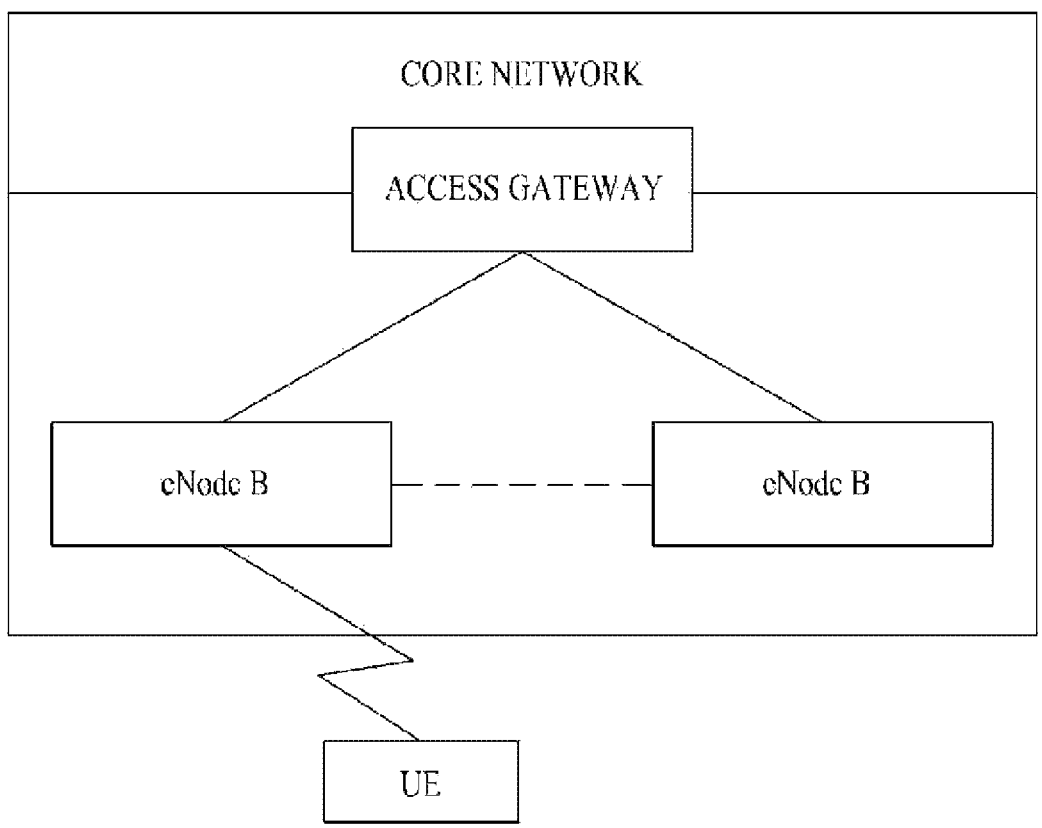
FIG. 1 is a diagram schematically illustrating a network structure of an evolved universal mobile telecommunications system (E-UMTS) as an exemplary radio communication system.
Figure 2:
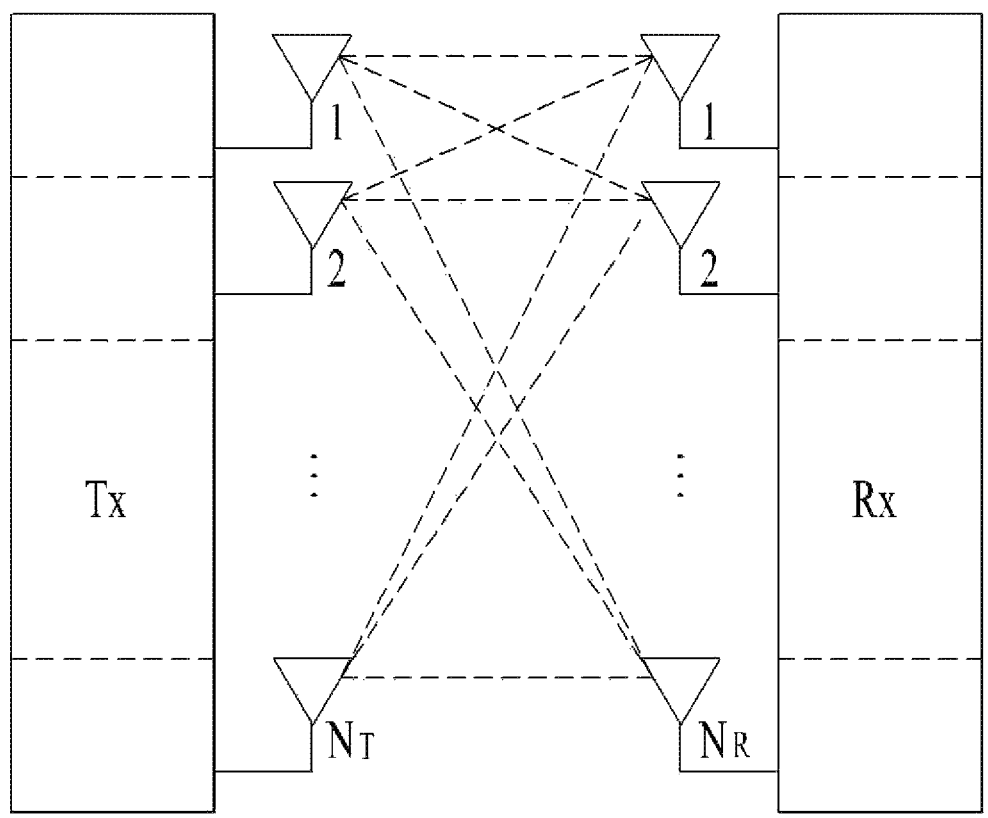
FIG. 2 is a diagram for a configuration of a multiple antenna communication system.

FIG. 2 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 2. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R)$$ [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)).

On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

Meanwhile, schemes for improving quality of experience by distributively arranging helper nodes having very large cache capacity, such as femto cells or user equipments, in a macro cell environment having limited backhaul link capacity to reduce a bottleneck of a backhaul link have been suggested.

For example, in a femto caching scheme, when popularity of video contents file is previously given by Zipf distribution, some parity bits of a file frequently requested are stored in a cache of a femto cell using rateless MDS (Maximum Distance Separable) code to minimize a delay time required for file transmission. If parity bits of a file requested by a user are stored in a cache of a neighboring femto cell, it is advantageous that backhaul traffic may be replaced and average delay time may be minimized during file transmission. In a coded content placement scheme of femto caching, if F video files, H helper nodes and U users exist and a ratio of a file f stored in a helper node h is $R=[\rho_{f,h}]$, optimized cache control is performed as expressed by the following Equation 8.

$$\text{minimize} \sum_{u=1}^{U} \sum_{f=1}^{F} P_f \max_{j \in \{1,2,\ldots,|\mathcal{H}(u)|\}} \{\overline{D}_u^{f,j}\}$$ [Equation 8]

$$\text{subject to} \sum_{f=1}^{F} \rho_{f,h} \leq M \; \forall \, h$$

$$R \in [0,1]^{F \times H}$$

In the above Equation 8, $\overline{D}_u^{f,j}$ is an average delay time required to allow a user u to recover a file by downloading parity bits of a file f from j best helper nodes, and is expressed by the following Equation 9.

$$\overline{D}_u^{f,j} = \sum_{i=1}^{j-1} \rho_f, (i)_u \omega_{(i)_u, u} + \left(1 - \sum_{i=1}^{j-1} \rho_f, (i)_u\right) \omega_{(j)_u, u}$$ [Equation 9]

In the above Equation 9, $\omega_{h,u}$ is an average download time required to allow a user u to receive a unit bit from the helper node h, and $(j)_u$ represents the jth best helper node in user equipment u.

The caching scheme of the related art mainly handles a method for arranging files in a cache, and does not consider a method for effectively using files stored in the cache. Quality of experience of a user is determined complexly by the amount of files stored in the cache and a channel condition of a helper node accessed by a user, an optimized combined design that departs from a design of an individual caching scheme and a multiple access scheme is necessarily required. Moreover, helper nodes which take part in cooperation for file transmission require an optimized algorithm of low-complexity due to restriction on hardware, it is required to design a cache and multiple access considering the optimized algorithm.

The present invention suggests a method and apparatus for overcoming limited backhaul capacity of a macro cell through popularity distribution of files requested frequently and simultaneously in a wireless content delivery network (CDN) in which a plurality of users and helper nodes having a cache memory are distributed, and caching and cell association based on radio channel information and maximizing spectrum usage.

A method for transmitting contents in a communication system according to the present invention is characterized in that files requested frequently from a core network at an off-peak hour at which traffic of a cellular network is not busy are downloaded and arranged in helper nodes distributed in a cluster, and amorphous cell association is performed considering a cache and channel state of the helper nodes at a peak-traffic hour at which traffic of the network is concentrated.

According to the present invention, data of large capacity may be stored efficiently through cluster-based collaborative caching (CCC) in a compact small cell environment, and files may quickly be transmitted to a plurality of users through cache-enabled multiple access (CEMA), whereby excessive traffic of a macro cell is distributed and thus average spectrum efficiency of an entire network may be improved remarkably. Also, since the installation cost of the helper nodes is low, it is expected that cost load of a cellular network may be solved at a considerable range. This will be described in more detail with reference to the drawing.

Figure 3:
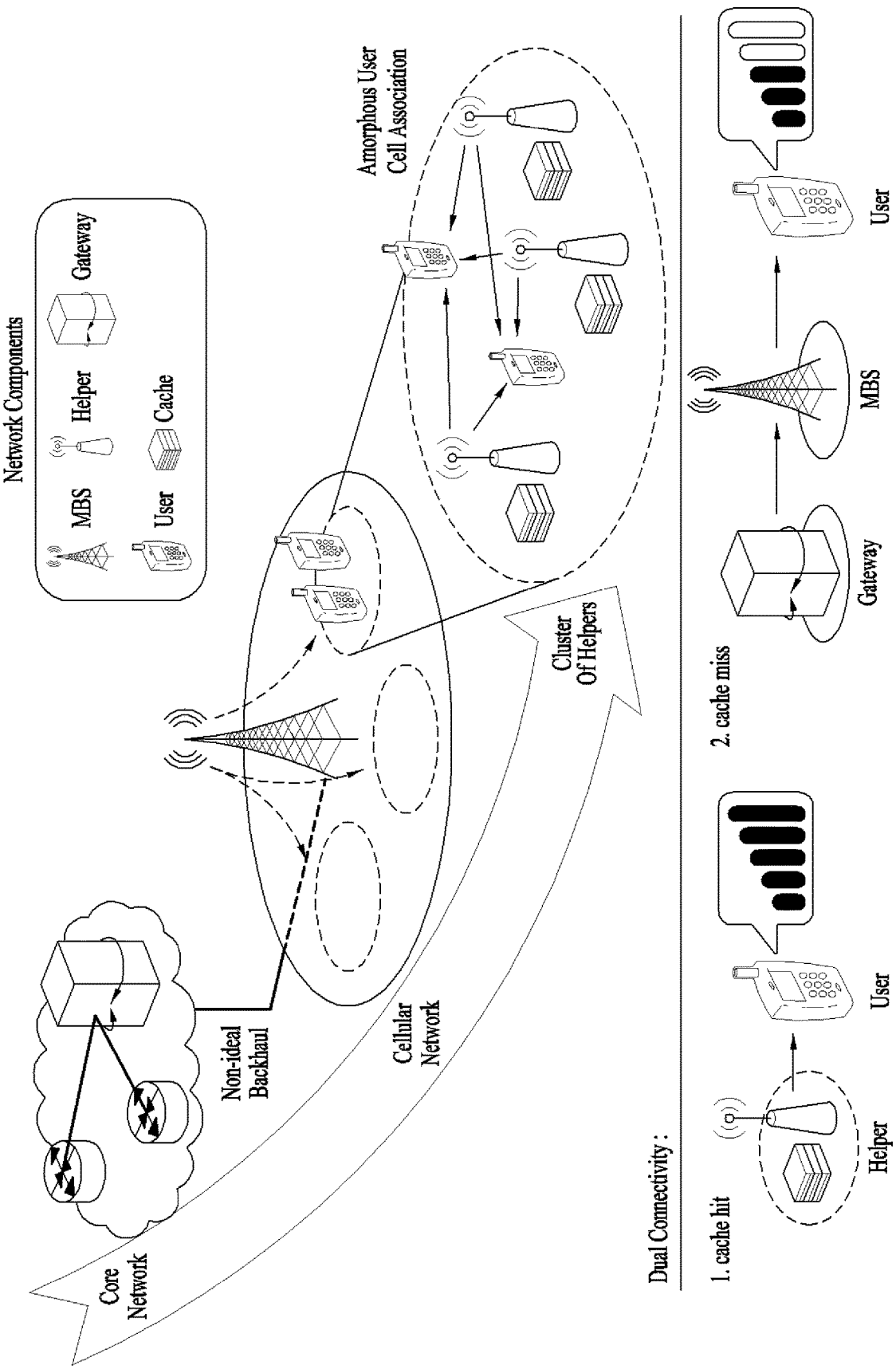
FIG. 3 is a diagram illustrating a cluster-based contents transmission network.

FIG. 3 is a diagram illustrating a cluster-based contents transmission network.

Referring to FIG. 3, a cluster-based content delivery network is shown in which helper nodes underlaid on a macro cell of which backhaul link capacity is limited to control the amount of parity bits stored in a cache through collaboration based on a cluster and a neighboring helper node instead of a macro base station transmits files if users respectively request the files. General collaborative wireless UEs as well as small base stations may serve as the helper nodes.

Figure 4:
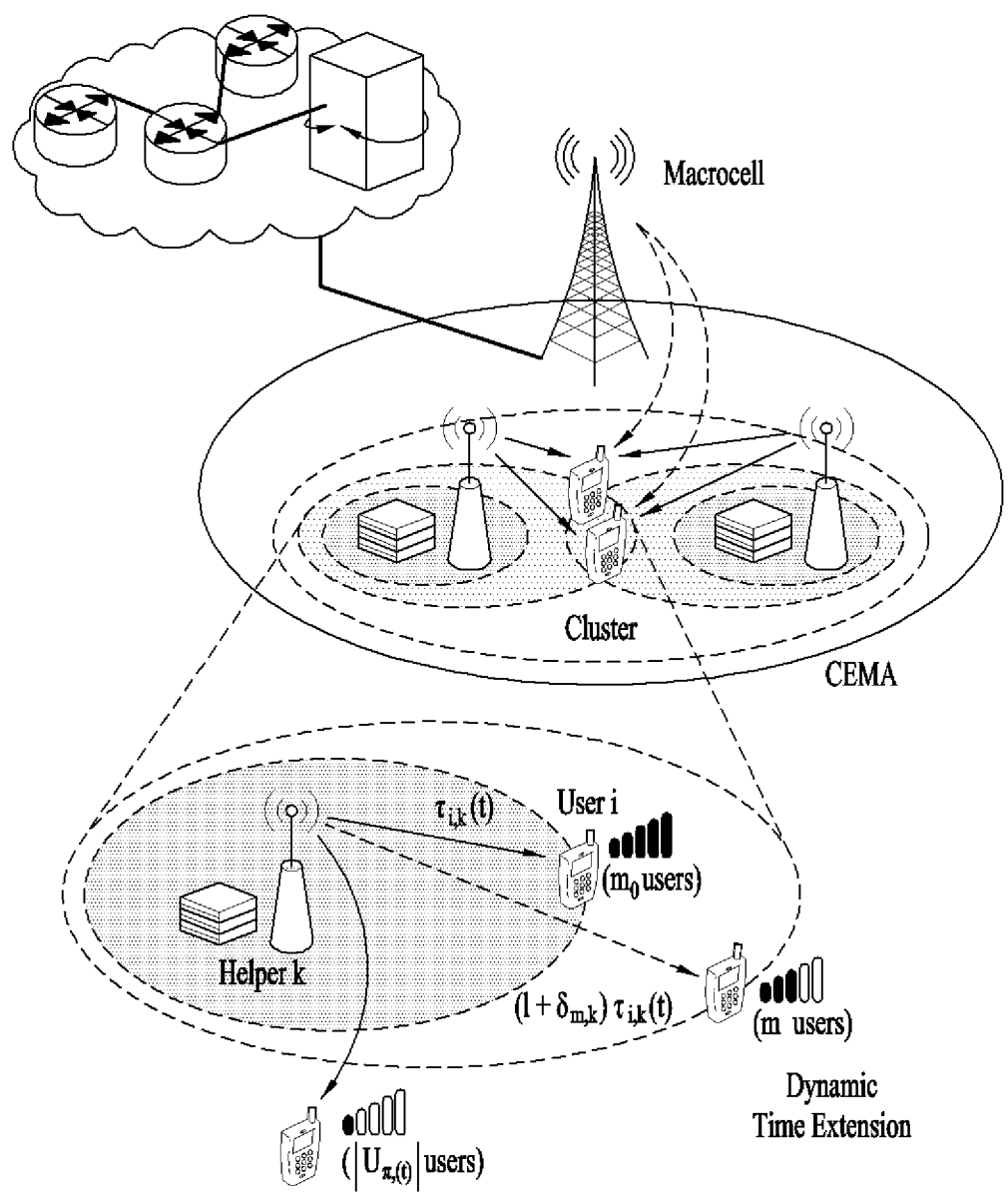
FIG. 4 is a diagram illustrating a cache-based multiple access system according to the embodiment of the present invention.
Figure 5:
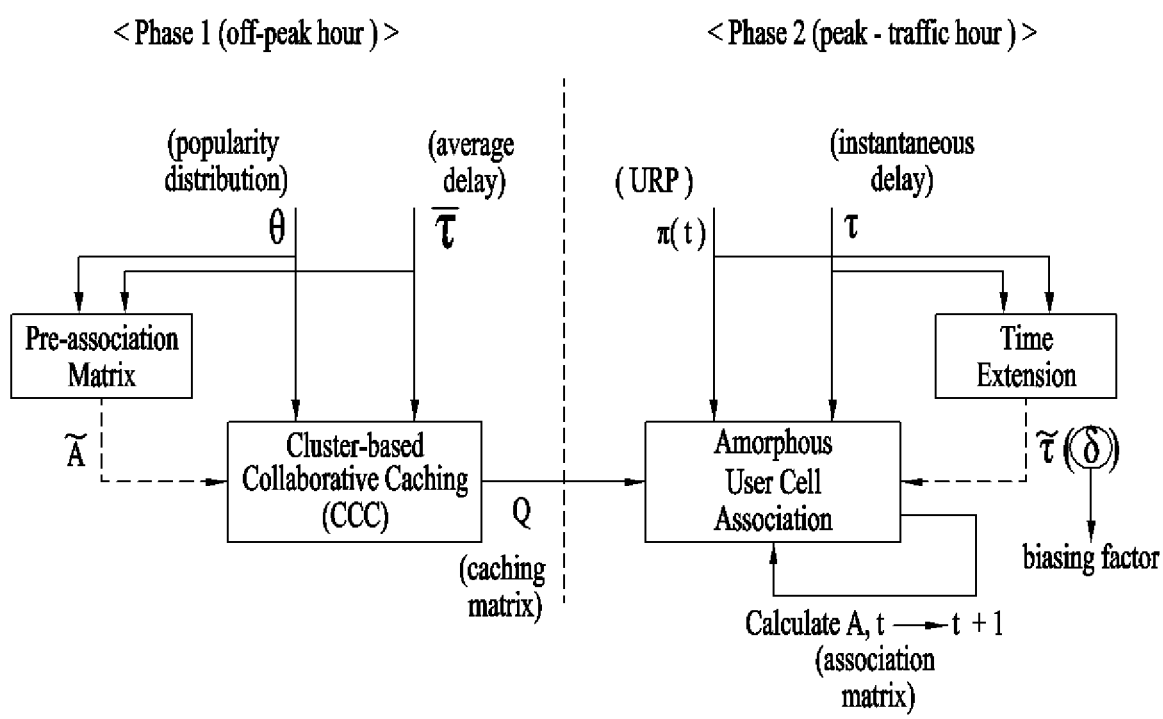
FIG. 5 is a block diagram illustrating a system according to the embodiment of the present invention.

FIG. 4 is a diagram illustrating a cache-based multiple access system according to the embodiment of the present invention, and FIG. 5 is a block diagram illustrating a system according to the embodiment of the present invention.

Referring to FIGS. 4 and 5, the helper nodes update a cache at an off-peak hour, and transmit files to users through cache-enabled multiple access (CEMA) as shown in FIG. 4 at a peak-traffic hour. The entire system includes a CCC (Cluster-based Collaborative Caching) block and Amorphous User Cell Association blocks, and performs mixed-timescale combined optimization to maximize a utility function, as shown in FIG. 5.

Particularly, referring to FIG. 5, in the present invention, operation is performed by two phases as follows.

<1. Collaborative Caching Phase>

In Phase 1, when popularity distribution θ of files and an average delay $\bar{\tau}$ are given as shown in FIG. 5, optimization of a parity bit ratio stored in a cache is performed, whereby a cache of helper nodes is updated. When the number of files is F, the number of users is N, and the number of helper nodes is K, an optimization problem is as expressed in the following Equation 10.

[Equation 10]

$$\max_Q \frac{1}{N} \sum_{\pi=1}^{F} \theta_\pi \sum_{n=1}^{N} \min_{\tilde{A}(\pi,j)} \sum_{k=1}^{K+1} S_\pi(\bar{\tau}_{n,K+1} - \bar{\tau}_{n,k}) q_{\pi,k} \tilde{a}_{n,k}(\pi, j) \quad (P1)$$

subject to $$\sum_{\pi=1}^{F} S_\pi q_{\pi,k} \leq M, \quad \forall k \quad (C1)$$

$$S_\pi(\bar{\tau}_{n,K+1} - \bar{\tau}_{n,k}) q_{\pi,k} \tilde{a}_{n,k}(\pi, j) \geq \quad (C2)$$
$$\min_{\tilde{A}(\pi,j)} S_\pi(\bar{\tau}_{n,K+1} - \bar{\tau}_{n,k}) q_{\pi,k} \tilde{a}_{n,k}(\pi, j), \quad \forall n, j, \pi$$

$$0 \leq q_{\pi,k} \leq 1, \quad \forall \pi, k \quad (C3)$$

In the above Equation 10, $\theta_\pi$ is popularity of a file π, and popularity distribution of a file f is given by $$\theta_f = \left(\frac{1}{f^\gamma}\right) / \left(\sum_{f=1}^{F} \frac{1}{f^\gamma}\right).$$

γ is Skewness of file popularity. n=1, . . . , N represent users, k=1, . . . , K represent helper nodes, and the K+1th helper node corresponds to a macro base station. $\bar{\tau}_{n,k}$ represents an average delay between the user n and the helper node k, and $\tilde{a}_{n,k}(\pi,j)$ is a Pre-association Matrix, and is as expressed in the following Equation 11.

$$\tilde{a}_{n,k}(\pi, j) = \quad \text{[Equation 11]}$$
$$\begin{cases} \frac{1 - \sum_{\forall i, \tau_{n,i} < \tau_{n,k_j^{(n)}}} q_{\pi,i}}{q_{\pi,k}} & \text{if } k = k_j^{(n)} \\ 1 & \text{if } k \neq k_j^{(n)}, \bar{\tau}_{n,k} < \bar{\tau}_{n,k_j^{(n)}} \\ 0 & \text{if } k \neq k_j^{(n)}, \bar{\tau}_{n,k} > \bar{\tau}_{n,k_j^{(n)}} \end{cases}$$

At this time, $k_j^{(n)}$ represents a helper node having a jth good channel from the user n.

The optimization problem P1 of the Equation 10 is a Max-min problem for obtaining $\{q_{f,k}\} \in Q$, Caching Matrix for maximizing worst-case utility, and the first restriction condition C1 means that the amount of parities stored in a cache of helper nodes cannot exceed a memory size M. Also, the second restriction condition C2 means that utility obtained by caching should be worst-case utility or more at a minimum range. The third restriction condition C3 means that files stored in the cache are encoded in a maximum distance separable (MDS) code and thus decoded if there are parity bits equivalent to the original file size. If Q is determined through the optimization problem, the cache may be updated by downloading files from a backhaul at an off-peak hour.

<2. Cell Association Phase>

In phase 2, cell association is performed to maximize momentary utility by using channel state information of a user, which is varied depending on time, that is, momentary delay τ and URP (User Request Profile) τ(t) as shown in FIG. 5. The user n may receive a service for an allocated time $\Delta t_n = \Delta t/N$ from a time equivalent to a total $\Delta t$ on the basis of time division multiple access (TDMA) and acquire parity bits through occasional or intermittent overhearing for the other time $(N-1)\Delta t/N$. At this time, a set of helper nodes that may be associated by the user n is given as expressed by the following Equation 12.

$$H_n = H_n(\pi_n(t), t) = \{k | q_{\pi_n(t),k} > 0, \Sigma_{s=t_{n,0}}^{t-1} \Sigma_{i=1}^{N} a_{i,k}(\pi_n(t), s) x_{i,k}^n(s) < 1\}$$ [Equation 12]

The set of helper nodes is determined considering the presence of files requested by the user and also considered such that parity bits already transmitted for a time $s \in [t_{n,0}, t-1]$ are not transmitted by overlap.

Users who simultaneously request the same file in a cluster may receive a service through multicasting as shown in FIG. 4. At this time, when the user i receives a service from the helper node k, an indicator for determining whether the user n overhears the service is determined as expressed by the following Equation 13.

$$x_{i,k}^n(t) = \begin{cases} 1, & \text{if } \pi_n(t) = \pi_i(t), \tau_{n,k} < \tilde{\tau}_{i,k} \\ 0, & \text{otherwise} \end{cases}$$ [Equation 13]

In the above Equation 13, $\tau_{n,k}$ is a transmission time required to transmit 1 bit file from the helper node k to the user n, and is expressed by the following Equation 14.

$$\tau_{n,k}(t) = \begin{cases} \dfrac{1}{B_n \log_2\left(1 + \dfrac{P_k}{N_0 B_n}|h_{n,k}(t)|^2\right)} & \text{if } k \le K \\ \max\left\{\dfrac{1}{B_n \log_2\left(1 + \dfrac{P_k}{N_0 B_n}|h_{n,k}(t)|^2\right)}, \dfrac{1}{R_{b,n}}\right\} & \text{if } k = K+1 \end{cases}$$ [Equation 14]

In this case, $B_n$ means a bandwidth allocated to the user n, $R_{b,n}$ means a backhaul rate allocated to the user n, $P_k$ means a transmission power of the helper node k, $N_0$ means Power Spectral Density (PSD) of noise, and $h_{n,k}$ means a channel between the user n and the helper node k. Also, $\tilde{\tau}_{i,k}$ is a transmission time required to transmit 1 bit file from the helper node k to the user i through time extension, and is expressed by the following Equation 15.

$$m^* = \arg\max_m \left\{ \dfrac{\tilde{\tau}_{i,k} = \hat{\tau}_{m,k}^*}{m} \over (1+\delta_{m,k})\tau_{i,k}\right\},$$ [Equation 15]

$$m = m_0, \ldots, |U_{\pi_i(t)}|$$

In the above Equation 15, $$\delta_{m,k} = \dfrac{\hat{\tau}_{m,k}(t) - \tau_{i,k}(t)}{\tau_{i,k}(t)}$$

is a biasing factor when m users simultaneously access the helper node k, and may be obtained by discovering m for maximizing $$\dfrac{m}{(1+\delta_{m,k})\tau_{i,k}}$$

given for the set $U_{\pi_i(t)}$ of the users requesting the same file $\pi_i(t)$.

If the set of the helper nodes and the biasing factor for multicasting are given, cache-enabled multiple access (CEMA) is given by the following Equation 16.

[Equation 16]

$$\max_{A(\pi(t),t)} \dfrac{1}{N} \sum_{n=1}^{N} \sum_{k \in H_n} S_{\pi_n(t)}(\tau_{n,K+1}(t) - \tilde{\tau}_{n,k}(t)) q_{\pi_n(t),k} a_{n,k}(\pi_n(t), t) \quad \text{(P2)}$$

subject to $$\sum_{k \in H_n} S_{\pi_n(t)} \tilde{\tau}_{n,k}(t) q_{\pi_n(t),k} a_{n,k}(\pi_n(t), t) \le \Delta t_n, \forall n \quad \text{(C1)}$$

$$\sum_{k \in H_n} q_{\pi_n(t),k} a_{n,k}(\pi_n(t), t) \le \quad \text{(C2)}$$

$$1 - \sum_{s=t_{n,0}}^{t-1} \sum_{i=1}^{N} \sum_{k=1}^{K} q_{\pi_i(t),k} a_{i,k}(\pi_i(s), s) x_{i,k}^n(s),$$

$$\forall n$$

$$0 < a_{n,k}(\pi_i(t), t) \le 1 - \sum_{s=t_{n,0}}^{t-1} \sum_{i=1}^{N} a_{i,k}(\pi_i(s), s) x_{i,k}^n(s), \quad \text{(C3)}$$

$$\forall n, k \in H_n$$
$$a_{n,k}(\pi_n(t), t) = 0,$$
$$\forall n, k \notin H_n$$

The above optimization problem P1 is a problem for discovering $\{a_{n,k}\} \in A$, Association matrix for maximizing momentary utility obtained when users access the helper node at time 't', wherein the first restriction condition C1 means that the time to which each user is allocated is limited to $\Delta t_n$ in TDMA, and the second restriction condition C2 means that minimum parity bits are transmitted to satisfy attribute of MDS code. The third restriction condition C3 means that the amount of parity bits transmitted by the helper node is controlled such that the user does not receive the same parity bit repeatedly.

If files requested by the user exist in the helper nodes which belong to a cluster, the files may be transmitted at very fast speed. If not so, the files should be transmitted from a macro base station connected with a core network. At this time, $a_{n,K+1}(\pi_n(t),t)$ is obtained as expressed by the following Equation 17.

$$a_{n,K+1}(\pi_n(t), t) = \quad \text{[Equation 17]}$$

$$\min\left\{1 - \sum_{s=t_{n,0}}^{t-1} \sum_{i=1}^{N} \sum_{k=1}^{K} q_{\pi_i(t),k} a_{i,k}(\pi_i(s), s) x_{i,k}^n(s),\right.$$

$$\Delta t_n - \sum_{k \in H_n} S_{\pi_n(t)} \tilde{\tau}_{n,k}(t) q_{\pi_n(t),k} a_{n,k}(\pi_n(t), t) \over S_{\pi_n(t)} \tau_{n,K+1}(t)$$

Since the user may occasionally perform overhearing through CEMA in accordance with a type of files requested by himself/herself, average spectrum efficiency may be improved remarkably at metropolitan populated areas (hot spots) where traffic is congested.

Figure 6:
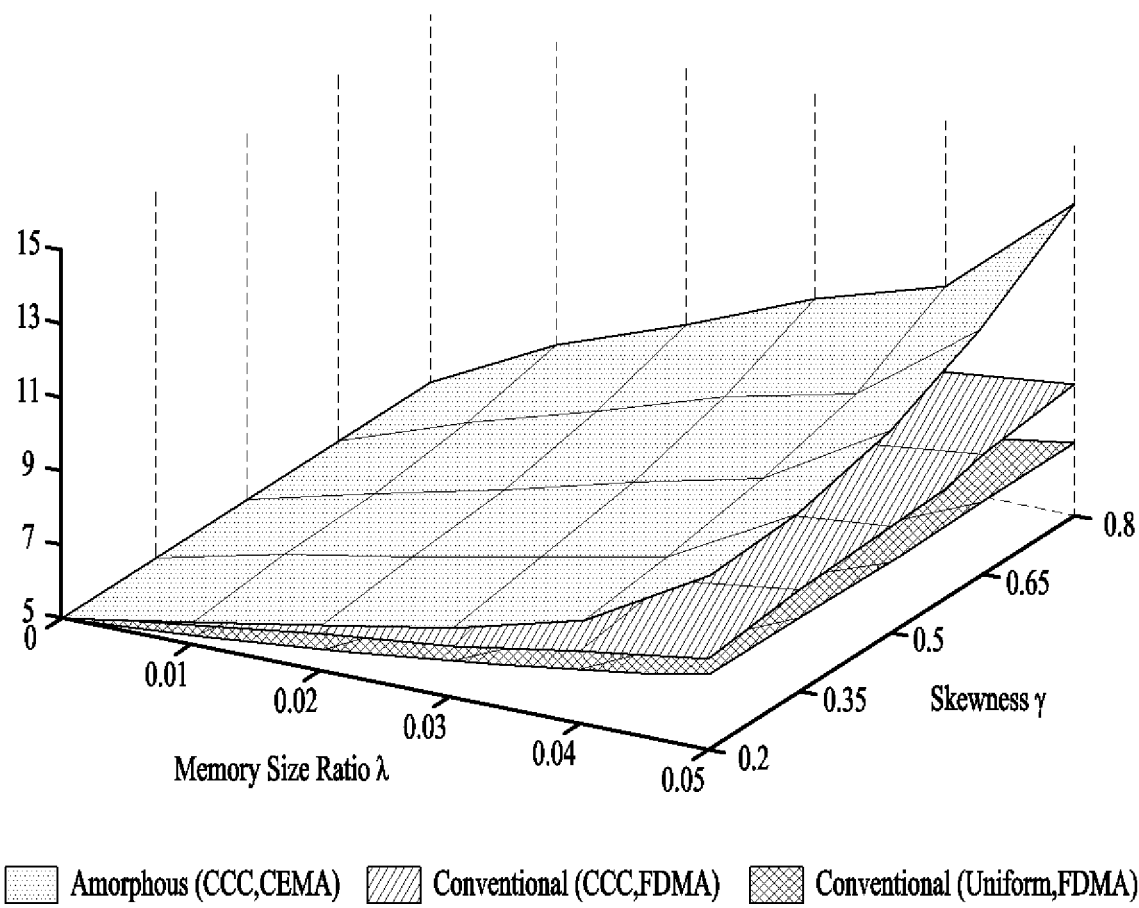
FIG. 6 is a diagram illustrating an average spectrum efficiency according to file popularity distribution γ and a size ratio λ of a cache memory.

FIG. 6 is a diagram illustrating an average spectrum efficiency according to file popularity distribution γ and a cache memory size ratio λ.

According to the present invention, since the helper nodes underlaid on a macro cell of which backhaul link capacity is limited may effectively transmit files instead of the macro base station, as shown in FIG. 6, average spectrum efficiency may be improved. Therefore, capacity of a cellular network may be increased remarkably, and improved QoE may be provided to users. Also, since the cache memory is cheaper than the cost for increase of base stations, the cost for communication network infrastructure construction may be saved remarkably.

The present invention is applicable to a mobile communication system such as indoor/outdoor small cell environment or device-to-device (D2D) communication considered in the actual standard. This scheme may be applied to general low power wireless UEs and IoT (Internet of Things) devices in which backhaul link capacity is limited. Similarly, cluster based cache and cache-enabled multiple access (CEMA) may be applied to even a mobile cloud computing environment.

Figure 7:
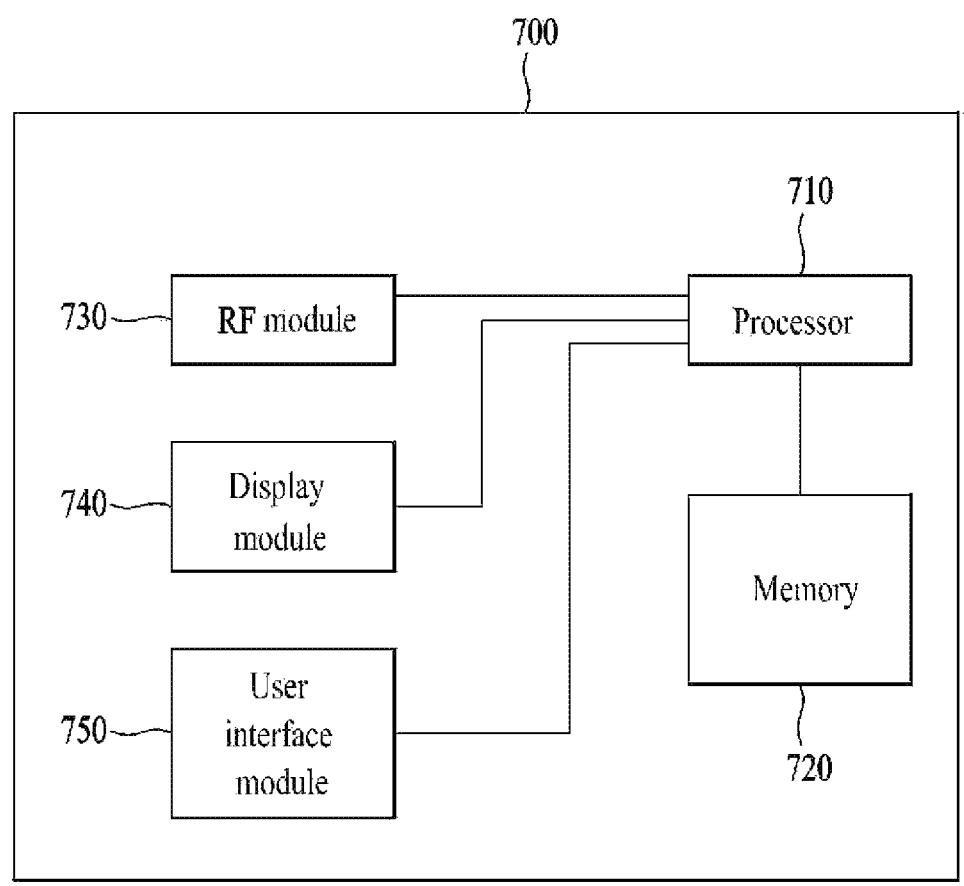
FIG. 7 is a block diagram of a communication apparatus according to an embodiment of the present invention.

FIG. 7 is a block diagram of a communication apparatus according to an embodiment of the present invention.

Referring to FIG. 7, the communication device 700 includes a processor 710, a memory 720, an RF module 730, a display module 740, and a user interface module 750.

The communication device 700 is illustrated for convenience of description and some modules may not be omitted. The communication device 700 may further include necessary modules. In addition, some modules of the communication device 700 may be subdivided. The processor 710 is configured to perform operations according to the embodiment of the present invention that is exemplified with reference to the diagrams. In detail, a detailed operation of the processor 710 would be understood with reference to FIGS. 1 to 6.

The memory 720 is connected to the processor 710 and stores an operating system, an application, a program code, data, etc. The RF module 730 is connected to the processor 710 and converts a baseband signal into a radio signal or converts a radio signal into a baseband signal. To this end, the RF module 730 performs analog conversion, amplification, filtering, and frequency up-conversion, or inverse procedures thereof. The display module 740 is connected to the processor 710 and displays various pieces of information. The display module 740 may use, but is not limited to, well-known elements such as a liquid crystal display (LCD), a light emitting diode (LED), and an organic light emitting diode (OLED). The user interface module 750 may be connected to the processor 710 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In this specification, a specific operation which has been described as being performed by the base station may be performed by an upper node of the base station as the case may be. That is, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for receiving, by a first user equipment (UE), data in a wireless communication system, the method comprising:
    receiving a first division code from a first helper node in a first time unit;
    overhearing a second division code transmitted from a second helper node to a second UE in a second time unit; and
    acquiring the data by using the first division code and the second division code,
    wherein the first division code and the second division code are arranged in the first helper node and the second helper node on the basis of popularity of the first UE for the data on an off-peak traffic hour of the wireless communication system, and wherein the first time unit and the second time unit are included in a peak-traffic hour of the wireless communication system.

2. The method according to claim 1, wherein the first division code and the second division code are not overlapped with each other.

3. The method according to claim 1, wherein the first division code and the second division code are rateless Maximum Distance Separable (MDS) codes.

4. The method according to claim 1, wherein the first helper node and the second helper node are determined considering the presence of the data and overlap of the first division code and the second division code.

5. A first user equipment (UE) in a wireless communication system, the first UE comprising:
 a radio frequency (RF) module; and
 a processor,
 wherein the processor controls the RF module to receive a first division code from a first helper node in a first time unit, overhear a second division code transmitted from a second helper node to a second UE in a second time unit, and acquire data by using the first division code and the second division code, wherein the first division code and the second division code are arranged in the first helper node and the second helper node on the basis of popularity of the first UE for the data on an off-peak traffic hour of the wireless communication system, and wherein the first time unit and the second time unit are included in a peak-traffic hour of the wireless communication system.

6. The UE according to claim 5, wherein the first division code and the second division code are not overlapped with each other.

7. The UE according to claim 5, wherein the first division code and the second division code are rateless Maximum Distance Separable (MDS) codes.

8. The UE according to claim 5, wherein the first helper node and the second helper node are determined considering the presence of the data and overlap of the first division code and the second division code.

* * * * *